April 29, 1941.　　　P. E. MATTHEWS　　　2,240,118
OILING DEVICE FOR DRIVING PINION BEARINGS
Filed Oct. 19, 1937
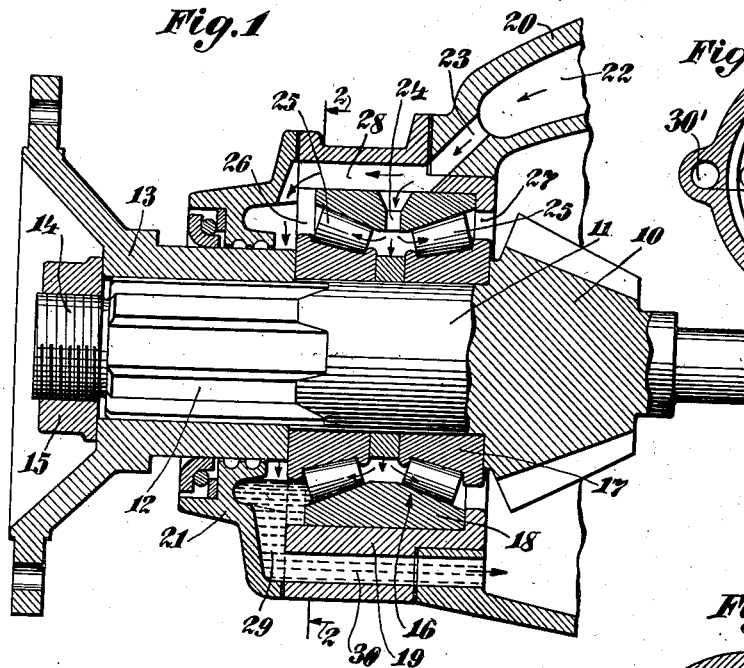
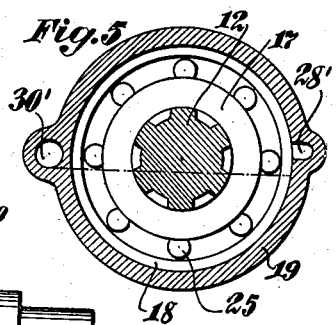
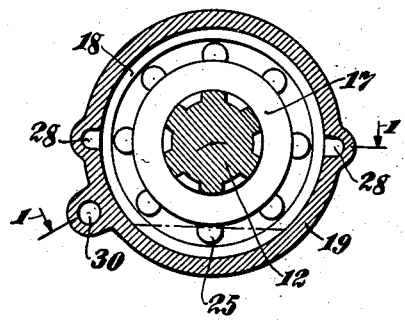
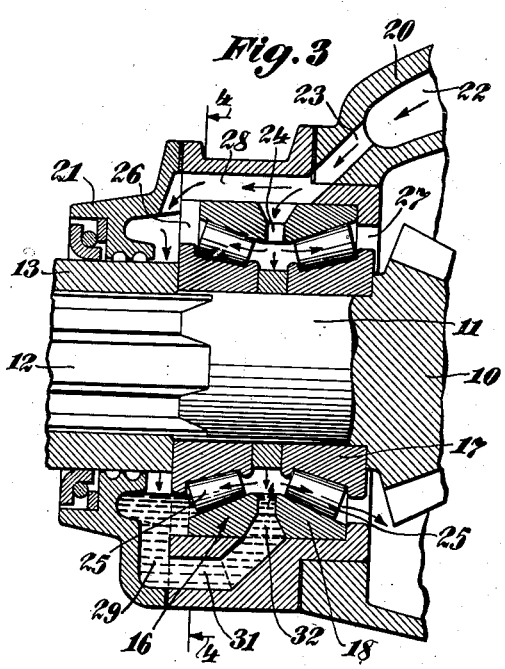
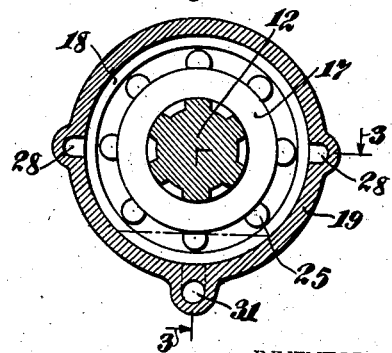
INVENTOR.
Philip E. Matthews,
BY　Bosquet, Heavy & Campbell,
HIS ATTORNEYS Patented Apr. 29, 1941

2,240,118

UNITED STATES PATENT OFFICE 2,240,118

OILING DEVICE FOR DRIVING PINION BEARINGS

Philip E. Matthews, Plainfield, N. J., assignor to Mack Manufacturing Corporation, Long Island City, N. Y., a corporation of Delaware Application October 19, 1937, Serial No. 169,783

5 Claims. (Cl. 184—11)

This invention relates to an oiling device and more specifically to a mechanism whereby the proper lubrication of a driving pinion bearing may be effectively accomplished.

In certain types of automotive vehicles designed for very heavy duty, it is customary to mount the rear axle main driving pinions in duplex tapered roller bearings which can readily withstand the high stresses encountered. These bearings are generally lubricated by providing a supply of oil which is fed by gravity to a point between the two coaxial sets of rollers in the duplex tapered roller bearing. The pumping action of the rollers forces the oil through the bearing, thus providing the film of oil so necessary to proper lubrication, after which the oil is returned to the source of supply.

This method of lubrication is perfectly satisfactory while the vehicle is running on level ground, but on a steep grade, part of the bearing is deprived of proper lubrication. This results because on an upgrade, the flow of oil due to gravity is reduced, and most of the oil which is fed to the point between the two sets of rollers tends to return to the source through the rear set of rollers, and little or none is supplied to the front set. If the incline is relatively long, therefore, the forward part of the bearing, being without proper lubrication, will become excessively hot and may eventually fail completely.

My invention provides an improved system of lubrication which insures the proper lubrication of all parts of the duplex tapered roller bearing under all conditions of operation. In this improved system, the supply of oil to the bearing is so controlled that a definite level of oil is maintained at all times in the bottom of the bearing retainer. This level is so chosen that the bottom rollers of the forward section of the bearing are always partially covered with oil, so that if the forward bearing is not supplied with oil by direct flow, as when climbing a grade, this will be compensated for by oil from the supply maintained in the bottom of the bearing retainer.

The operation of the system can be better understood from the following detailed description and from the accompanying diagrams, in which:

Figure 1 is a view in section of a device constructed in accordance with this invention, taken along the line 1—1 of Figure 2, and looking in the direction of the arrows;

Figure 2 is an end view in section taken along the line 2—2 of Figure 1, looking in the direction of the arrows;

Figure 3 is a view in section taken along the line 3—3 of Figure 4, looking in the direction of the arrows, showing a modified form of the invention;

Figure 4 is an end view in section of the modification of Figure 3, taken along the line 4—4, looking in the direction of the arrows;

Figure 5 is an end view in section illustrating a further modification of the construction shown in Figure 2.

As applied to a pinion bearing, and shown in Figure 1, the device comprises a main driving pinion 10 on a shaft 11, the end of which has a spline section 12 adapted to receive a coupling member 13. Beyond the spline section 12 is a threaded extension 14 provided with a lock nut 15 by means of which the coupling member 13 is secured to the shaft 11.

A duplex tapered roller bearing 16 is mounted on the shaft 11, its lower race 17 being affixed thereto, while the upper race 18 is fastened to the bearing retainer 19, which is secured to the carrier housing 20. Undesirable foreign matter is kept out of the roller bearing by a bearing cover 21 fitted with appropriate dust-sealing means.

Lubricating oil is supplied from the pockets 22 in each side of the carrier housing 20, through the passages 23 therein, to the bearing retainer 19. At this point part of the oil enters an opening 24 in the bearing outer race 18 through which it is fed to each half of the roller bearing 16. The pumping action of the rollers 25 forces the oil toward their larger ends where it is returned to the carrier housing 20 through the open spaces 26 and 27, respectively, between the inner and outer races of the duplex tapered roller bearing 16.

Oil is also fed from the passage 23 to a groove 28 in the bearing retainer 19, whence it is discharged into the bearing cover 21, the lower section of which serves as a sump 29 in which the discharged oil is collected. The level of the collected oil rises until it reaches the edge of the outlet passage 30 which is located in one side of the bearing retainer 19 and by means of which excess oil is returned to the carrier housing 20.

As illustrated in Figure 2, the oil outlet passage 30 is so located that the lowest roller 25 of the bearing 16 is partially submerged in the collected oil. In this manner the lubrication of the forward rollers 25 is adequately provided for. When the bearing is in a horizontal position, as where the vehicle is running on a level road, both parts of the bearing are lubricated by the direct flow of oil from the pocket 22 in the carrier housing 20, and in addition, the forward part of the bearing receives lubrication from the oil collected in the sump 29.

As the bearing is tilted so that its front end points upwardly, its forward section is no longer lubricated by a direct flow of oil, but proper lubrication is still maintained by the oil in the sump 29 which partially covers the front rollers 25 of the roller bearing 16. In this fashion the duplex tapered roller bearing will be properly lubricated under all conditions of operation. Excessive heating of the bearing and its consequent failure are thereby avoided.

In the modification illustrated in Figure 3, the outlet passage 31 leads to an opening 32 in the bearing outer race 18 between the two halves of the duplex bearing, and the oil is returned to the carrier housing 20 through the rear section of the roller bearing 16 by means of the pumping action of the rollers 25. As shown in the section of Figure 4, the passage 31 is placed in the bottom of the bearing retainer 19.

Oil will collect in the sump 29 of this modification until it reaches the inner edge of the outer race 18 of the roller bearing 16, when it will be discharged by the action of the tapered rollers 25 adjacent the housing 20 into the carrier housing 20. Oil at this level partially covers the tapered rollers 25, so that even with the bearing 16 tilted upwardly to the left, its front end will still receive a plentiful supply of oil.

Where maximum protection for the front bearing is desired, the level of lubricant in the sump chamber 29 should be maintained as high as is possible. Such a high level may be obtained by forming the outlet opening higher up in the side of the bearing retainer 19, the limiting position being the height of the inlet opening 28. In a preferred construction illustrated in Figure 5, an oil inlet opening 28' is located in the bearing retainer 19 above the horizontal center line of the shaft 12. The outlet 30' is placed on the opposite side of the bearing retainer 19 and lies slightly below the inlet 28'. Its diameter is made greater than that of the inlet 28' to insure that the level of the oil in the sump chamber 29 will not rise above the inlet 28' and thus block the flow of oil from the carrier housing 20. The natural pumping action of the tapered rollers 25 adjacent the sump chamber 29 prevents the leakage of oil through the bearing into the carrier housing while the unit is in operation, so that the level of the oil in the sump 29 is always sufficient to adequately lubricate all parts of the bearing under the most severe conditions of operation.

This improved lubricating means therefore will eliminate much of the loss of time and money which results when bearings of this type become damaged due to insufficient or improper lubrication.

While the lubricating device has been described as applied to a pinion bearing, it is to be understood that it is not limited to any such use, but is capable of modified application to various other mechanisms, within the scope of the appended claims.

I claim:

1. In a lubricating system, a plurality of closely spaced front and rear bearing sections, said sections defining a lubricating passageway therebetween communicating at its lower extremity with both bearing sections, means for supplying lubricant to said passageway, a sump chamber external to said bearing sections communicating with the front bearing section, and means for maintaining the level of lubricant in the sump chamber sufficient to submerge the lowest bearing portion of the front bearing section for all positions of operation.

2. In a lubricating system, a duplex bearing comprising an inner and an outer race and front and rear bearing sections, said bearing sections and races defining a lubricating passageway therebetween, means for supplying lubricant to said passageway, a sump chamber communicating with the front bearing section, and means for maintaining the level of lubricant within the sump chamber sufficient to submerge the lowest bearing portion of the front bearing section for all positions of operations.

3. In a lubricating system, a plurality of closely spaced front and rear bearing sections, said sections defining a lubricating passageway therebetween communicating at its lower extremity with both bearing sections, means for supplying lubricant to said passageway, a sump chamber external to said bearing sections communicating with the front bearing section, and means comprising an outlet disposed above the level of the lowest bearing portion, for maintaining the level of lubricant in the sump chamber sufficient to submerge the lowest bearing portion of the front bearing section for all positions of operation.

4. In a lubricating system, a plurality of closely spaced front and rear bearing sections, said sections defining a lubricating passageway therebetween communicating at its lower extremity with both bearing sections, a sump chamber external to said bearing sections communicating with the front bearing section, an inlet for supplying lubricant to the lubricating passageway, and means comprising an outlet of greater diameter than said inlet and disposed above the level of the lowest bearing portion, for maintaining the level of lubricant in the sump chamber sufficient to submerge the lowest bearing portion of the front bearing section for all positions of operation.

5. In a lubricating system, a plurality of closely spaced front and rear bearing sections, said sections defining a lubricating passageway therebetween communicating at its lower extremity with both bearing sections, means for supplying lubricant to said passageway, a sump chamber external to said bearing sections communicating with the front bearing section, and means comprising a passageway from the sump chamber to said first-named lubricating passageway for maintaining the level of lubricant in the sump chamber sufficient to submerge the lowest bearing portion of the front bearing section for all positions of operation.

PHILIP E. MATTHEWS.